(12) United States Patent
Jerlhagen et al.

(10) Patent No.: US 8,102,836 B2
(45) Date of Patent: Jan. 24, 2012

(54) SYNCHRONIZATION OF A SPLIT AUDIO, VIDEO, OR OTHER DATA STREAM WITH SEPARATE SINKS

(75) Inventors: Sven Jerlhagen, Jarfalla (SE); Mattias Per Agren, Lund (SE); Sathiyanarayanan Krithikaivasan, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 684 days.

(21) Appl. No.: 11/752,880

(22) Filed: May 23, 2007

(65) Prior Publication Data

US 2008/0291891 A1 Nov. 27, 2008

(51) Int. Cl.
*H04J 3/06* (2006.01)
(52) U.S. Cl. .... 370/350; 370/503; 455/41.2; 455/575.2; 455/3.06
(58) Field of Classification Search .................. 370/350, 370/503; 455/41.2, 575.2, 3.06
See application file for complete search history.

(56) References Cited

U.S. PATENT DOCUMENTS

| | | | |
|---|---|---|---|
| 6,542,754 B1 | 4/2003 | Sayers et al. | |
| 2003/0235179 A1 | 12/2003 | Tuomela et al. | |
| 2004/0228367 A1* | 11/2004 | Mosig | 370/503 |
| 2004/0258047 A1* | 12/2004 | Miao | 370/352 |
| 2005/0070225 A1 | 3/2005 | Lee | |
| 2005/0152330 A1* | 7/2005 | Stephens et al. | 370/350 |
| 2005/0259754 A1* | 11/2005 | Ho et al. | 375/240.28 |
| 2006/0221936 A1 | 10/2006 | Rauchwerk | |
| 2007/0009071 A1 | 1/2007 | Singh | |
| 2007/0058762 A1* | 3/2007 | Hudson et al. | 375/354 |
| 2007/0232222 A1* | 10/2007 | de Jong | 455/3.06 |
| 2008/0040759 A1* | 2/2008 | She et al. | 725/81 |
| 2008/0122986 A1 | 5/2008 | Diederichsen | |
| 2008/0242229 A1* | 10/2008 | Sharma | 455/41.3 |
| 2008/0279162 A1 | 11/2008 | Desai | |
| 2008/0291863 A1 | 11/2008 | Agren | |

FOREIGN PATENT DOCUMENTS

| EP | 1398931 A1 | 3/2004 |
|---|---|---|
| WO | 2006110960 A1 | 10/2006 |

OTHER PUBLICATIONS

"Specification of the Bluetooth System: Master Table of Contents & Compliance Requirements", Covered Core Package version: 2.0 + EDR, (Nov. 4, 2004),1230 pages.
European Search Report for App. No. 08009038.4 dated Oct. 19, 2010, 4 pages.

* cited by examiner

*Primary Examiner* — Barry Taylor
(74) *Attorney, Agent, or Firm* — Fiala & Weaver P.L.L.C.

(57) ABSTRACT

Methods, systems, and apparatuses for synchronizing one or more output/sink devices are described. In each sink device, a communication packet is received from a source device. The communication packet includes data and a source clock timestamp. A local clock signal is generated that is synchronized with a source clock signal of the source device. The data is decoded using a codec. At least one delay and the source clock timestamp are subtracted from a current value of the local clock signal to generate a local latency value. A difference between a desired latency value and the local latency value is determined. A rate of a clock signal of the codec is adjusted according to the determined difference. Because each sink device adjusts its latency to a common desired latency value, the sink devices are thereby synchronized.

24 Claims, 11 Drawing Sheets

300

```
┌─────────────────────────────────────────────────┐   302
│ a synchronization packet is received from the source device │
│ that provides information regarding a master clock signal   │
└─────────────────────────────────────────────────┘
                        │                             304
┌─────────────────────────────────────────────────┐
│ a local clock signal is synchronized with the master │
│ clock signal according to the provided information  │
└─────────────────────────────────────────────────┘
```

FIG. 3

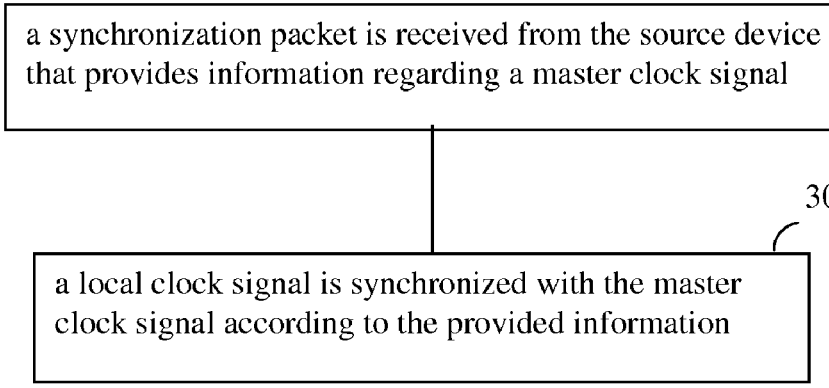

FIG. 4

SYNCHRONIZATION OF A SPLIT AUDIO, VIDEO, OR OTHER DATA STREAM WITH SEPARATE SINKS

BACKGROUND OF THE INVENTION

1. Field of the Invention

The present invention relates to the synchronization of sink devices that receive data, such as audio and/or video data, wirelessly streamed by a source device.

2. Background Art

Wireless communication protocols, such as the BLUETOOTH protocol, enable a variety of types of data streams to be provided by source devices to sink devices in a wireless fashion. For example, audio and video data may be streamed by the source devices to the sink devices. However, in cases where related data is streamed to multiple sink devices by a source device, it may be difficult to synchronize the processing and outputting of the data by the sink devices. For example, audio data may be transmitted by a music player to wireless speakers. It is desirable for the audio outputs of the speakers to be synchronized so that the audio may be heard clearly, and in stereo, by a listener. In another example, video data may be transmitted by a video source to wireless video display devices. It may be desirable that the video image streams output by the video display devices be synchronized. In still another example, a media source may transmit audio data to one or more wireless speakers and video data to one or more wireless display devices. It may be desirable that the audio sound and video image streams output by the speaker(s) and display(s) be synchronized for synchronized listening and viewing by the audience.

Thus, what is desired are ways of synchronizing the output of data streamed to sink devices in a wireless fashion.

BRIEF SUMMARY OF THE INVENTION

Methods, systems, and apparatuses for synchronizing one or more output/sink devices are described. Each sink device receives a stream of data from a source device. In each sink device, a data output latency is determined, and is compared against a desired data output latency, to determine a latency difference. A rate of data output by each sink device is adjusted according to the determined latency difference, to synchronize a timing of data output across the sink devices.

In an example aspect, each sink device executes a similar process: a communication packet is received from the source device. The communication packet includes data and a source clock timestamp. A local clock signal is generated that is synchronized with a source clock signal of the source device. The data is decoded using a codec. At least one delay and the source clock timestamp are subtracted from a current value of the local clock signal to generate a local latency value. A difference between a desired latency value and the local latency value is determined. A rate of a clock signal of the codec is adjusted according to the determined difference.

In a further example aspect of the present invention, an output system for data streamed from a source device is provided. The output system includes one or more output/sink devices, each sink device including a radio frequency (RF) communication module, a local clock signal generator, a codec, an output element, and a latency calculator. For each sink device, the RF communication module is configured to receive a communication packet from a source device. The communication packet includes data and a source clock timestamp. The local clock signal generator is configured to generate a local clock signal synchronized with a source clock signal of the source device. The codec is configured to decode the data, and to optionally convert the decoded data to analog form. The output element is configured to receive the decoded data and generate an output signal. The latency calculator is configured to subtract at least one delay and the source clock timestamp from a current value of the local clock signal to generate a local latency value. The latency calculator further determines a difference between a desired latency value and the local latency value. A rate of the codec clock signal is adjusted according to the determined difference.

In aspects, the data may be audio data, video data, or other type(s) of data. The output element for each sink device may be a speaker, a display device, or other type of output element. A variety of communication protocols may be used for communications between the source device and sink device(s), such as the BLUETOOTH protocol. When the source and sink device(s) are configured to communicate according to the BLUETOOTH protocol, the source clock signal may be the BLUETOOTH master clock, and the local clock signal(s) may be BLUETOOTH slave clock(s).

These and other objects, advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 3 shows a flowchart for synchronization of devices in a BLUETOOTH piconet.

FIG. 4 shows an example synchronization packet.

The present invention will now be described with reference to the accompanying drawings. In the drawings, like reference numbers indicate identical or functionally similar ele-

DETAILED DESCRIPTION OF THE INVENTION

Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Example Wireless Communication Systems

Figure 1:
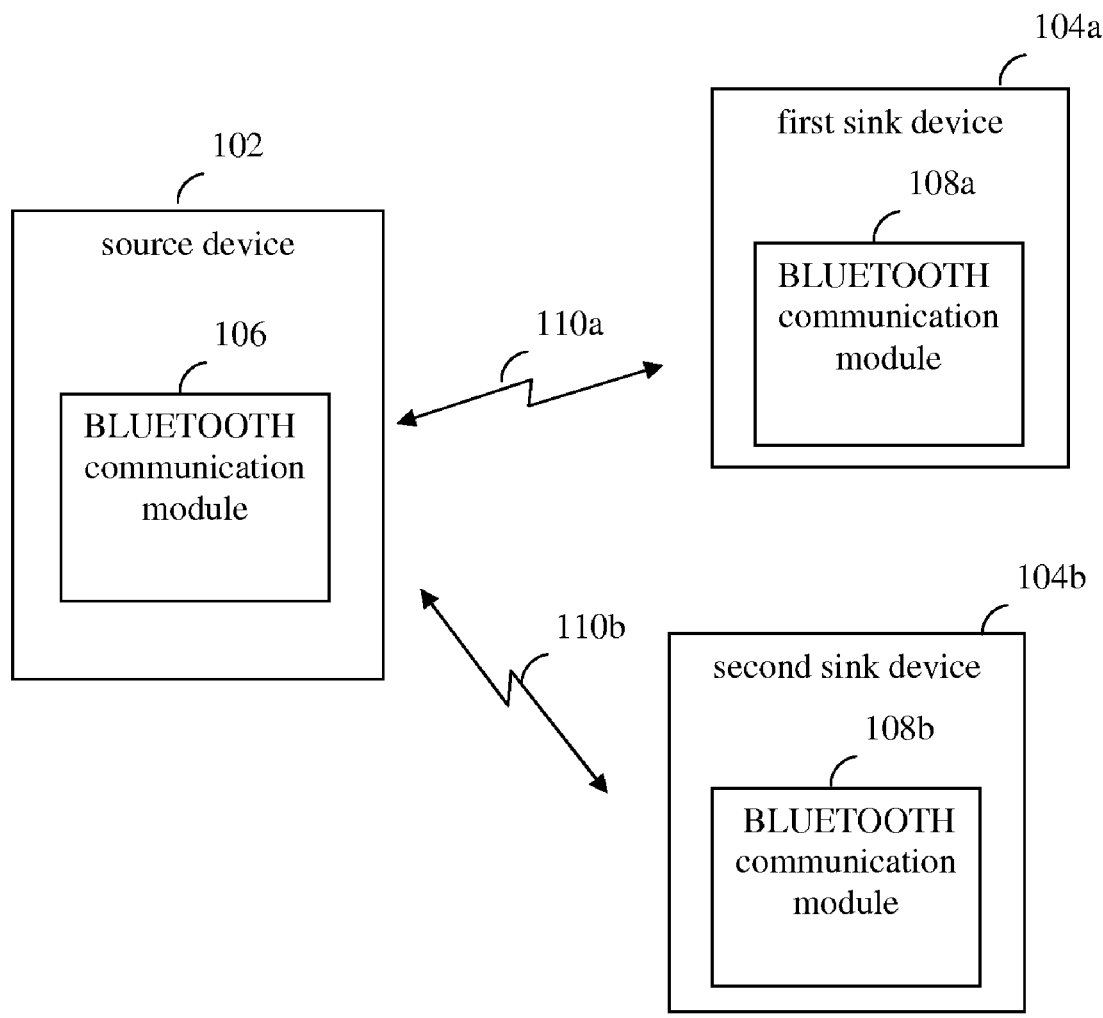
FIGS. 1 and 2 show block diagram views of an example BLUETOOTH wireless communications system.

A variety of wireless communication protocols exist that enable devices to communicate in a wireless fashion. For example, FIG. 1 shows an example BLUETOOTH wireless communication system 100. As shown in FIG. 1, system 100 includes a source device 102, a first sink device 104a, and a second sink device 104b. Source device 102 may be any type of device, mobile or immobile, that is configured to provide a stream of data to one or more sink devices 104, such as a pair of sink devices 104a and 104b. For example, source device 102 may be an audio source device such as a music player (e.g., an MP3 player, an APPLE IPOD, etc.) or mobile phone (e.g., a cell phone), a video source device (e.g., a cable box that supplies digital video, an analog video signal receiver or tuner, etc.) a mixed media source device (e.g., a stereo receiver that sources video and audio), or a device (e.g., a computer system) that sources other types of data streams. Sink devices 102 may be any type of device that receives and processes a received data stream, such as a wireless speaker (e.g., an earphone or headset speaker, a home audio speaker, etc.), a wireless display device (e.g., a wireless flat screen television, including a high-definition television), or other device.

As shown in FIG. 1, source device 102 includes a BLUETOOTH communication module 106, first sink device 104a includes a BLUETOOTH communication module 108a, and second sink device 104b includes a BLUETOOTH communication module 108b. BLUETOOTH communication module 106 enables master device 102 to communicate with first and second sink devices 104a and 104b according to a BLUETOOTH communication protocol. BLUETOOTH communication module 106 communicates with BLUETOOTH communication module 108a using a first communication channel 110a, and communicates with BLUETOOTH communication module 108b of second sink device 104b using a second communication channel 110b. For example, first and second communication channels 110a and 110b may each include RF communication signals transmitted in a unicast (point-to-point; uni- or bi-directional) channel manner between source device 102 and a respective, designated one of first and second sink devices 104a and 104b. Alternatively, first and second communication channels 110a and 110b may be broadcast (unidirectional) channels between source device 102 and first and second sink devices 104a and 104b.

Figure 2:
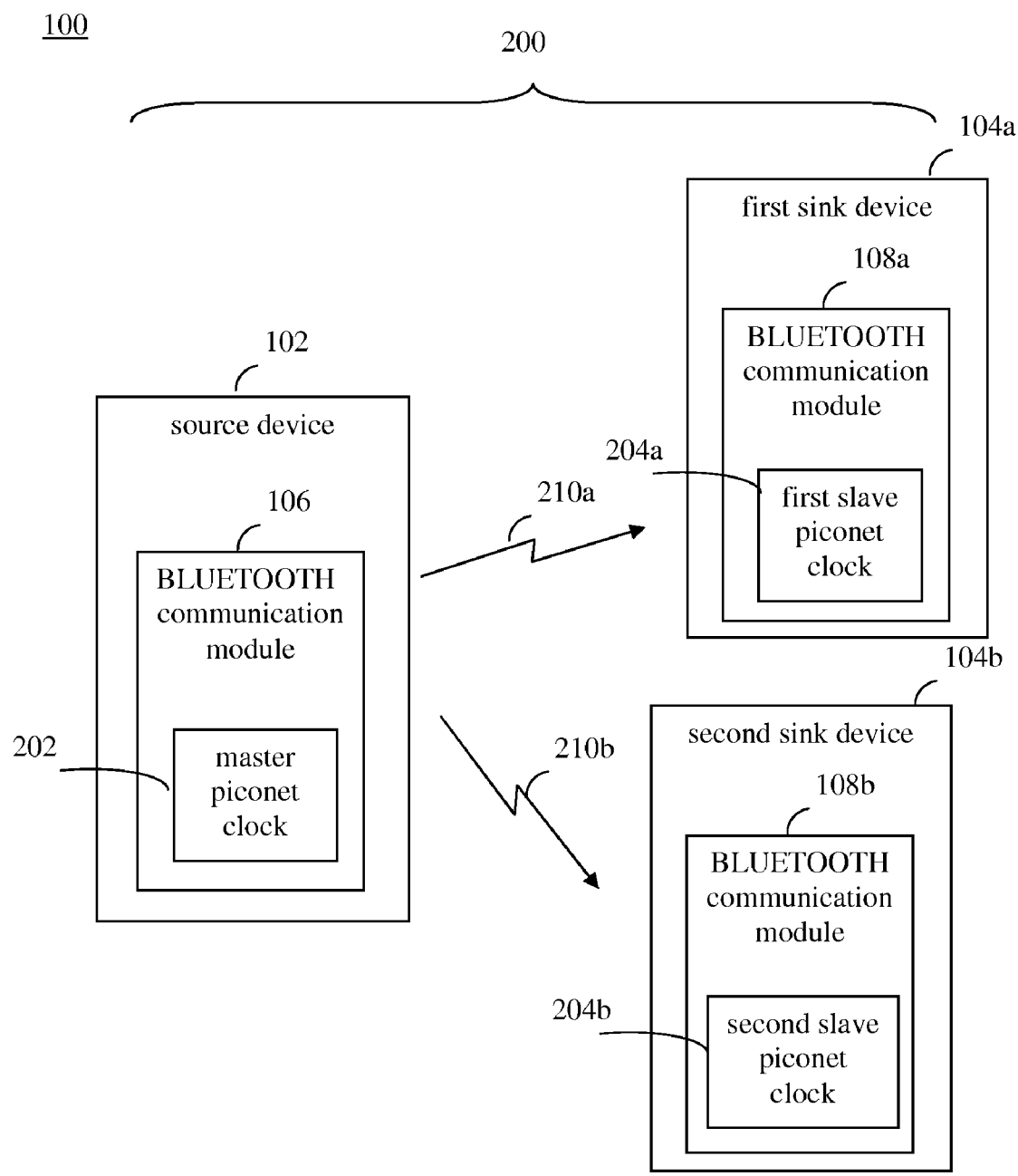

For example, FIG. 2 shows BLUETOOTH communication module 106 communicating with BLUETOOTH communication modules 108a and 108b to form a BLUETOOTH piconet 200 that includes source device 102, first sink device 104a, and second sink device 104b. In the example of FIG. 2, source device 102 is a "master" device of piconet 200, and first and second sink devices 104a and 104b are "slave" devices of piconet 200. Although a pair of slave devices 104a and 104b are shown in FIG. 2 for illustrative purposes, additional slave devices 104 may be present in piconet 200. For example, a current BLUETOOTH specification allows for up to seven slave devices. Embodiments are applicable to any number of slave devices, including a number of slaves up to a limit allowed by a relevant protocol specification.

As shown in FIG. 2, BLUETOOTH communication module 106 of source device 102 includes a master piconet clock 202. BLUETOOTH communication module 108a of first sink device 104a includes a first slave piconet clock 204a, and BLUETOOTH communication module 108b of second sink device 104b includes a second slave piconet clock 204b. Clocks 202, 204a and 204b have a common frequency according to the BLUETOOTH specification (e.g., a 625 µsec period).

When BLUETOOTH devices first connect as in FIG. 2, a value of the master device clock and the device address (BD_ADDR) of the master device are passed to the slave devices in a special packet called a frequency-hop synchronization packet (FHS packet). In FIG. 2, first communication channel 110a includes a synchronization packet 210a transmitted by source device 102 to first sink device 104a, and second communication channel 110b includes a synchronization packet 210b transmitted by source device 102 to second sink device 104b. Synchronization packets 210a and 210b are frequency-hop synchronization packets that synchronize sink devices 104a and 104b with source device 102.

A flowchart 300 shown in FIG. 3 illustrates this synchronization process. In step 302 of flowchart 300, a synchronization packet is received from the master device that provides information regarding the master clock signal. For example, as shown in FIG. 2, synchronization packets 210a and 210b are received by first and second sink devices 104a and 104b from source device 102, each including a synchronization packet. FIG. 4 shows an example synchronization packet 210. As shown in FIG. 4, synchronization packet 210 includes a master piconet clock information 402 and a master device address 404. Master piconet clock information 402 includes information regarding master piconet clock 202 of source device 102, such as a current clock value of master piconet clock 202. Master device address 404 is the device address (BD_ADDR) of source device 102.

In step 304 of flowchart 300, a local (slave) clock signal is synchronized with the master clock signal according to the provided information. For example, in FIG. 2, first slave piconet clock 204a is synchronized with master piconet clock 202 using the master piconet clock information 402 received in synchronization packet 210a. For example, the current clock value of master piconet clock 202 provided by master piconet clock information 402 may be stored in first slave piconet clock 204a and in second slave piconet clock 204b.

According to current BLUETOOTH standards, master and slave clocks can be very closely synchronized, such as to about 1 μsec.

Master device address 404 of source device 102 is used in sink devices 104a and 104b to calculate a sequence of frequency hops that all devices in piconet 200 will follow. The current value of master piconet clock 202 decides which is the current hop in the sequence (the phase). All sink devices in a piconet keep track of a difference between their own native clock (e.g., slave piconet clock 204) and the clock of the master (master piconet clock 202 via master piconet clock information 402), so they know exactly which frequency to transmit or receive on at any moment. Source device 102 and sink devices 104a and 104b communicate with each other at the various frequencies to which they synchronously hop. Further description regarding the BLUETOOTH protocol may be found in "Specification of the Bluetooth System," Bluetooth Specification Version 2.0+EDR (vol 0-vol 4), copyright 2004, 1230 pages, which is incorporated herein by reference in its entirety.

According to the BLUETOOTH protocol described above, a data stream may be provided by source device 102 to sink devices in a wireless fashion. Embodiments of the present invention further described below are applicable to the BLUETOOTH protocol, and to other wireless communication protocols. In this manner, audio, video, and other types of data may be streamed by source device 102 to sink devices 104a and 104b. In some cases, it may be difficult to synchronize the outputting of the data by the sink devices. For instance, in the example of FIG. 2, it may be desirable for first and second sink devices 104a and 104b to play audio and/or display video in a synchronized fashion. When both of devices 104a and 104b play synchronized audio, it is desired that a listener hear the audio in stereo without distortion. When devices 104a and 104b respectively play audio and display a video image stream, it is desired that the audio and video be matched in time.

Thus, what is needed are ways of synchronizing the outputs of sink devices. Embodiments of the present invention are described below that enable parallel, synchronized data to be output by multiple sink devices. Such embodiments may be implemented in BLUETOOTH and other types of communication systems.

Example Embodiments

The example embodiments described herein are provided for illustrative purposes, and are not limiting. The examples described herein may be adapted to any type of wireless data source and sink devices. Example embodiments are described below with respect to the BLUETOOTH protocol. However, embodiments may use communications protocols other than BLUETOOTH, as would be known to persons skilled in the relevant art(s) from the teachings herein. Furthermore, additional structural and operational embodiments, including modifications/alterations, will become apparent to persons skilled in the relevant art(s) from the teachings herein.

Figure 5:
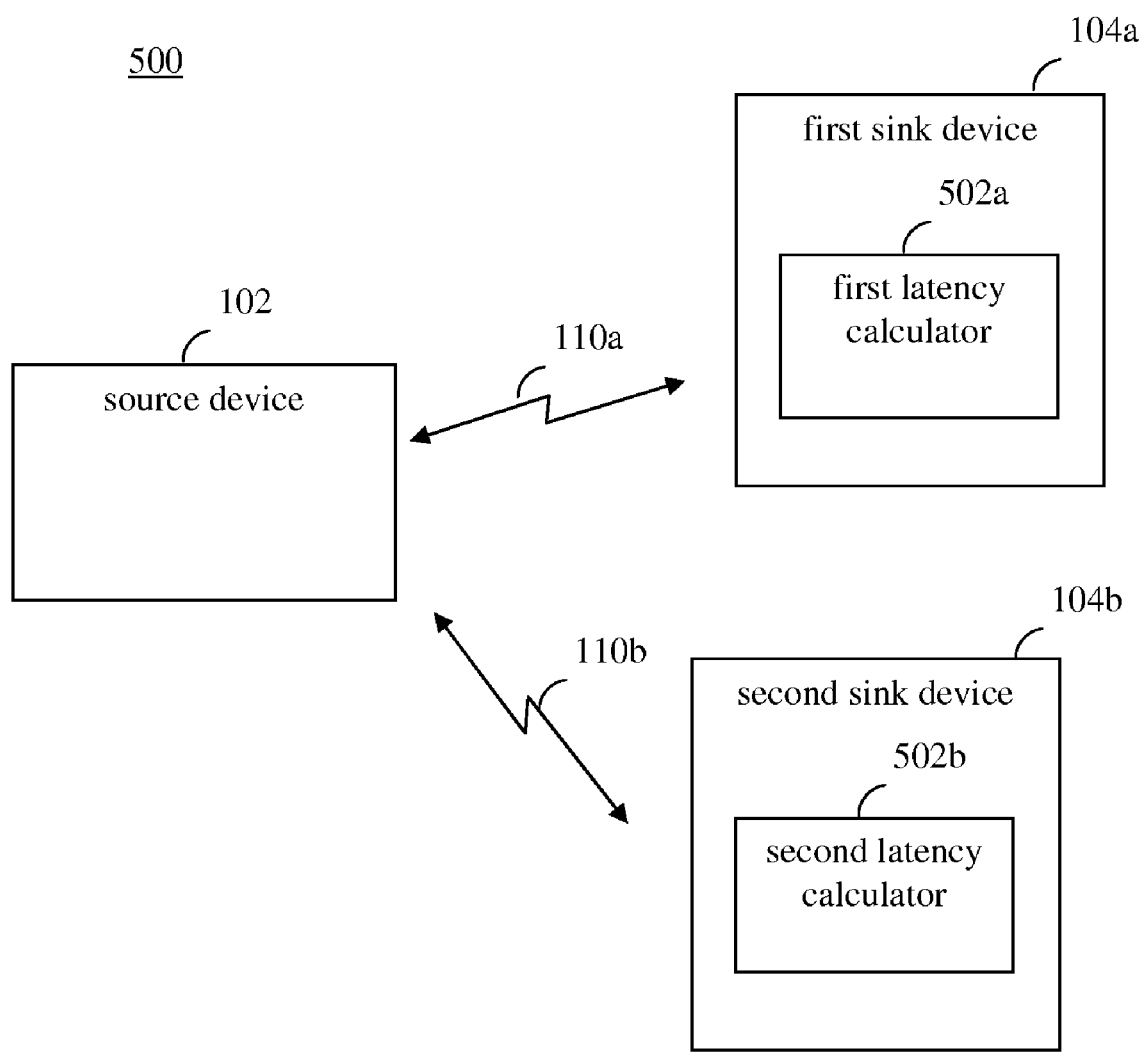
FIG. 5 shows an example BLUETOOTH wireless communication system, according to an embodiment of the present invention.

FIG. 5 shows an example BLUETOOTH wireless communication system 500, according to an embodiment of the present invention. As shown in FIG. 5, system 500 is generally similar to system 100 of FIG. 1. System 500 includes source device 102, first sink device 104a, and second sink device 104b. However, in system 500, first sink device 104a includes first latency calculator 502a and second sink device 104b includes a second latency calculator 502b. First latency calculator 502a calculates latency for data received in first communication channel 110a and output (e.g., played, displayed, etc.) by first sink device 104a. Second latency calculator 502b calculates latency for data received in second communication channel 110b and output (e.g., played, displayed, etc.) by second sink device 104b. First and second latency calculators 502a and 502b enable first and second sink devices 104a and 104b to output their respective data in sync with each other. Thus, in an audio data embodiment, the audio may be output by each of first and second sink devices 104a and 104b in sync (e.g., in stereo). In an embodiment where first sink device 104a outputs audio and second sink device 104b outputs corresponding video, the audio and video may be output in sync (e.g., voice audio is in sync with video image stream mouth movement).

Figure 6:
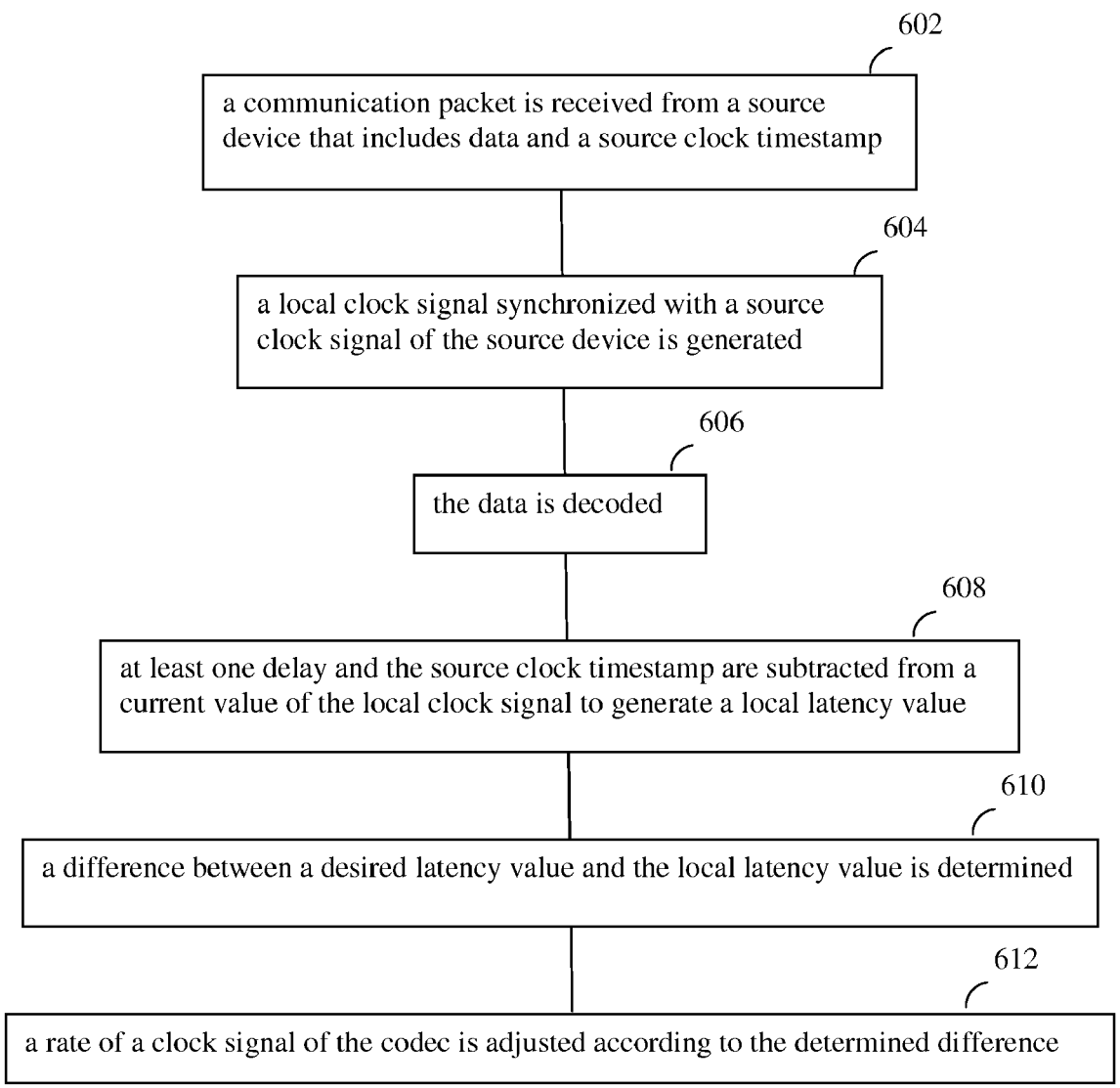
FIG. 6 shows a flowchart providing example steps for a process operating in a sink device to enable synchronized data output with other sink devices, according to example embodiments of the present invention.
Figure 7:
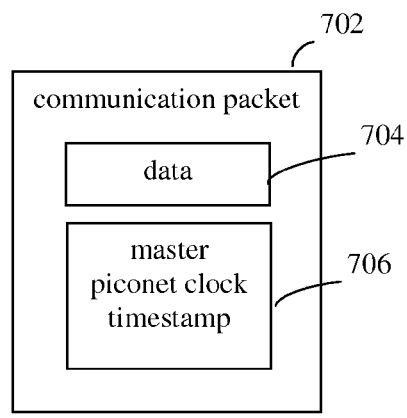
FIG. 7 shows an example communication packet that may be received by a sink device from a source device, according to an example embodiment of the present invention.
Figure 8:
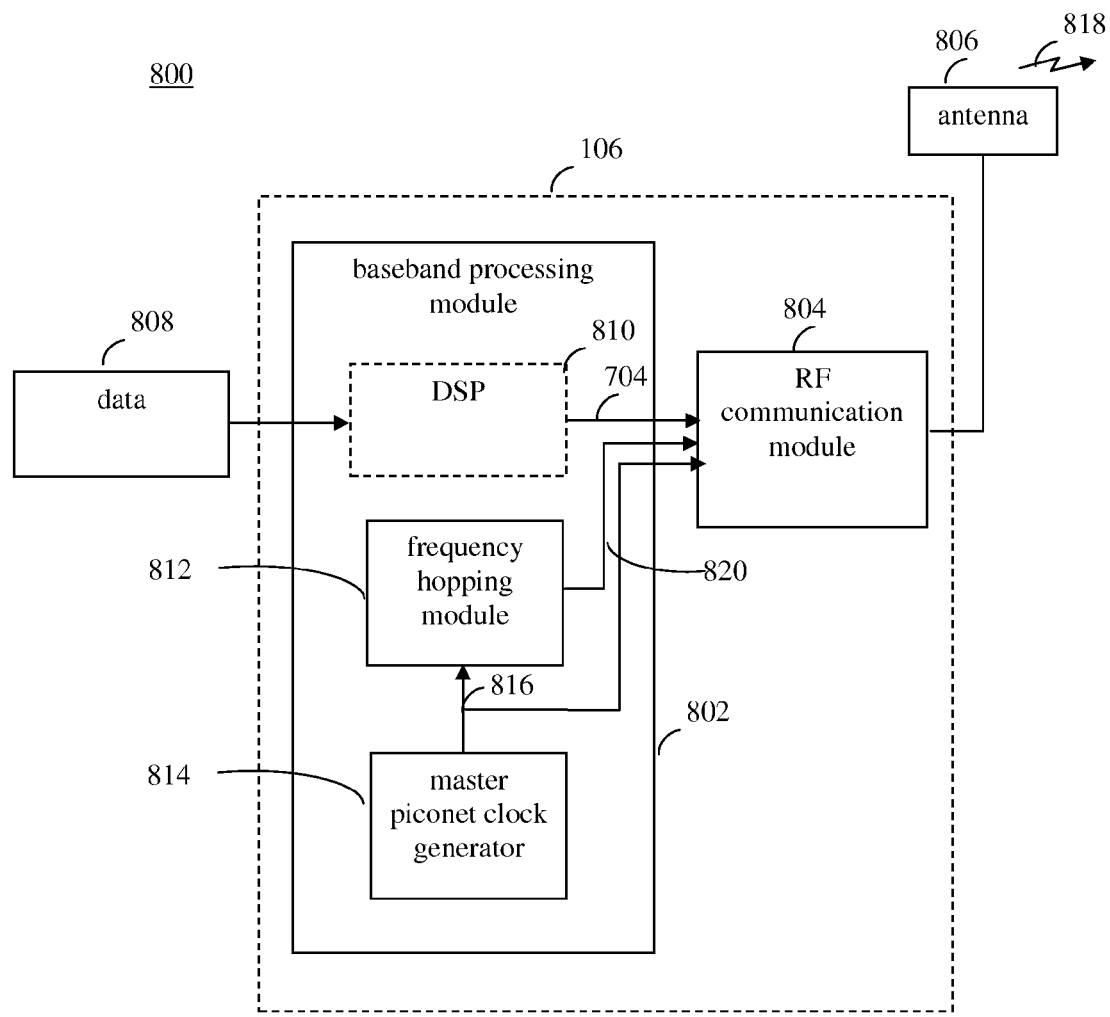
FIG. 8 shows a block diagram of an example source device, according to an embodiment of the present invention.
Figure 9:
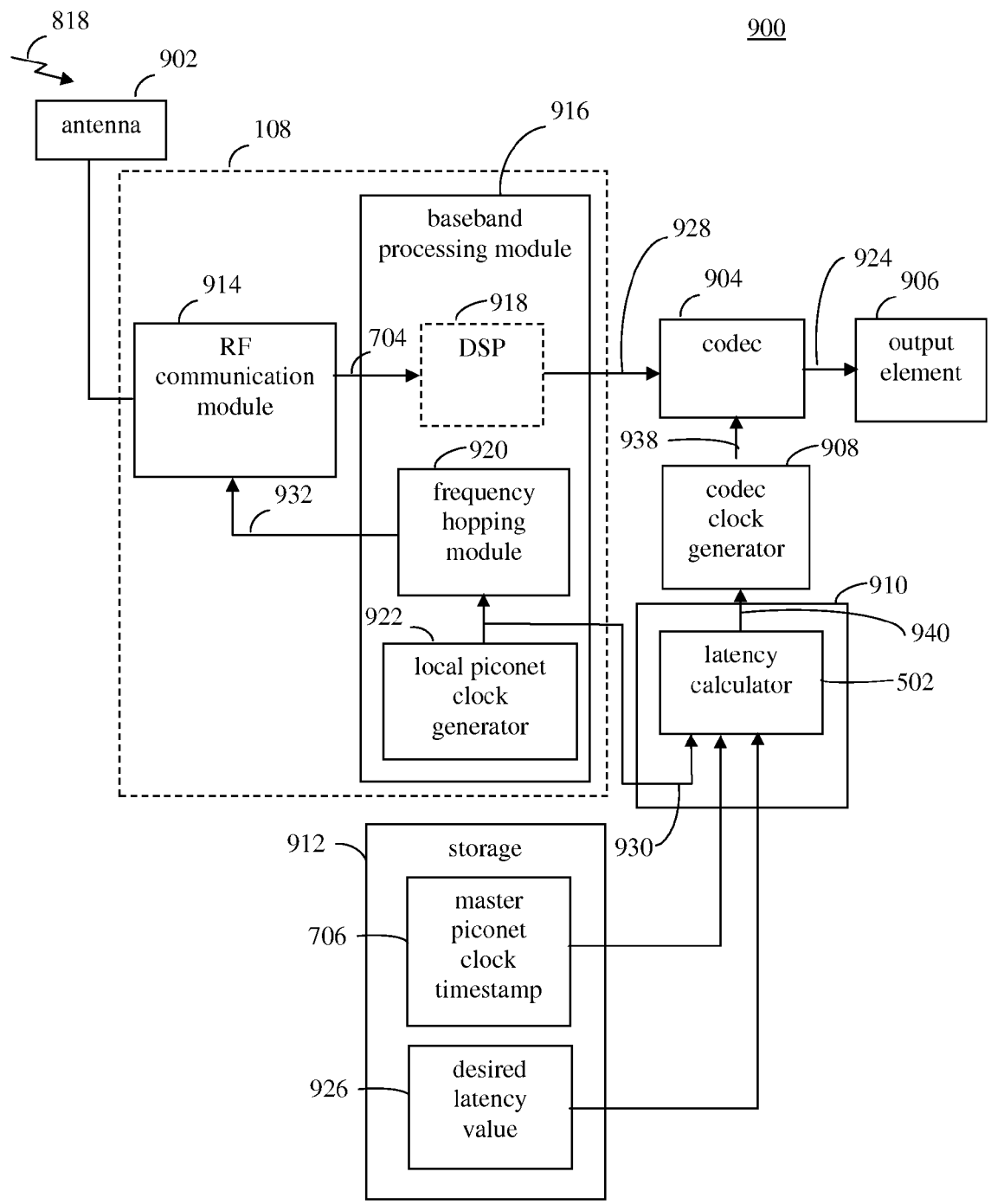
FIG. 9 shows a block diagram of an example sink device, according to an embodiment of the present invention.

FIG. 6 shows a flowchart 600 providing example steps for a process operating in each sink device to enable synchronized data output, according to example embodiments of the present invention. Other structural and operational embodiments will be apparent to persons skilled in the relevant art(s) based on the following discussion. Flowchart 600 is described below with respect to FIGS. 7-9 for illustrative purposes. FIG. 7 shows an example communication packet 702 that may be received in a communication channel 110 from a source device, according to an example embodiment of the present invention. FIG. 8 shows a block diagram of an example source device 800, and FIG. 9 shows a block diagram of an example sink device 900, according to embodiments of the present invention.

Flowchart 600 begins with step 602. In step 602, a communication packet is received from a source device that includes data and a source clock timestamp. For instance, FIG. 7 shows communication packet 702 including data 704 and a master piconet clock timestamp 706. Data 704 may be any type of data, including audio data or video data. For example, data 704 may be a portion of an audio or video data stream provided by source device 102 in a stream of communication packets similar to communication packet 702. Master piconet clock timestamp 706 is a value of a master piconet clock of source device 102 at the time that communication packet 702 is transmitted by source device 102.

FIG. 8 shows source device 800, which is an example of source device 102 of FIG. 5, and is configured to generate communication packet 702 shown in FIG. 7. Source device 800 may be a music player, mobile computer, cell phone, or other type of source device mentioned elsewhere herein or otherwise known. As shown in FIG. 8, source device 800 includes data 808, BLUETOOTH communications module 106, and an antenna 806. Data 808, which may be audio, video, and/or other data, is received by baseband communications module 106. BLUETOOTH communications module 106 packages data 808 into a packet (e.g., communication packet 702) formatted according to the BLUETOOTH protocol, and generates an RF communications signal 818 that includes the BLUETOOTH data packet. Antenna 806 transmits RF communications signal 818.

As shown in the example of FIG. 8, baseband communications module 106 includes a baseband processing module 802 and a RF communications module 804. Baseband processing module 802 runs the BLUETOOTH software stack and controls RF communication module 804. For example, baseband processing module 802 may include a microcontroller to run the BLUETOOTH software stack. Furthermore, in the example of FIG. 8, baseband processing module 802 includes a digital signal processor (DSP) 810, a frequency hopping module 812, and a master piconet clock generator 814. DSP 810 is optionally present. When present, DSP 810 may be used to process data 808. For example, DSP 810 may be used to convert a stream of data from one form to another form of data that is output to RF communication module 804 as data 704. For example, data 808 may include MP3 formatted audio data. DSP 810 may be used to convert the MP3 audio data to SBC (sub band coding) data (e.g., decoding the MP3 data, and encoding the resulting data into SBC format), which is output to RF communication module 804. Alternatively, DSP 810 is not present, and data 808 may be left unaltered when provided to RF communication module 804.

Master piconet clock generator 814 generates a BLUETOOTH master clock signal 816. Frequency hopping module 812 receives master clock signal 816. Frequency hopping module 812 determines a pseudo-random hopping sequence of RF channels for RF communication module 804. The hopping sequence is unique for piconet 200 and is determined by the device address of source device (master device). The phase in the hopping sequence is determined by master clock signal 816. An indication of the determined pseudo-random hopping sequence is output by frequency hopping module 812 on frequency hopping sequence indicator signal 820.

RF communication module 804 receives data 704, master clock signal 816, and frequency hopping sequence indicator signal 820. RF communication module 804 includes a transmitter, and may include a receiver. The transmitter and receiver may be configured as a transceiver if both are present. RF communication module 804 is configured to modulate data onto an RF carrier signal having a frequency determined by frequency hopping sequence indicator signal 820. The RF carrier signal is generally near 2.45 GHz for BLUETOOTH communication signals. RF communication module 804 may generate communication packet 702 by modulating data 704 and master piconet clock timestamp 706 on a carrier signal. Master piconet clock timestamp 706 is a selected value of master clock signal 816 prior to transmitting communication packet 702 from source device 800. Communication packet 702 is transmitted by antenna 806 in communication signal 818.

Referring back to flowchart 600 in FIG. 6, in step 604, a local clock signal synchronized with a source clock signal of the source device is generated. FIG. 9 shows sink device 900, which is an example of a sink device 104 shown in FIG. 1, and which is configured to receive communication signal 818 according to step 602 of flowchart 600. Furthermore, sink device 900 is configured to synchronize a local clock signal with master clock signal 816 of source device 800 of FIG. 8.

As shown in FIG. 9, sink device 900 includes BLUETOOTH communication module 108, an antenna 902, a codec 904, an output element 906, a codec clock generator 908, a processing module 910, and a storage 912. BLUETOOTH communication module 108 receives communication signal 818 from antenna 902, which includes communication packet 702. BLUETOOTH communication module 108 extracts communication packet 702 from communication signal 818. BLUETOOTH communication module 108 outputs a data signal 928 and a slave clock signal 930. Slave clock signal 930 is a local BLUETOOTH piconet clock signal for BLUETOOTH communication module 108.

As shown in FIG. 9, in an embodiment, BLUETOOTH communication module 108 includes a RF communication module 914 and a baseband processing module 916. Baseband processing module 916 runs the BLUETOOTH software stack and controls RF communication module 914. RF communication module 914 includes a receiver, and may include a transmitter. The transmitter and receiver may be configured as a transceiver if both are present. RF communication module 914 is configured to down-convert and demodulate data received on RF communication signal 818. A frequency of RF communication signal 818 is determined by a frequency hopping sequence indicator signal 932.

RF communication module 914 recovers communication packet 702, which includes data 704 and master piconet clock timestamp 706. Master piconet clock timestamp 706 is stored in storage 912. As shown in the example of FIG. 9, baseband processing module 916 includes a DSP 918, a frequency hopping module 920, and local piconet clock generator 922. Local piconet clock generator 922 generates slave clock signal 930. Local piconet clock generator 922 is synchronized with master piconet clock generator 814 of source device 800 by a synchronization packet previously transmitted by source device 800 to sink device 900, as described above with reference to synchronization packet 210 shown in FIG. 4. Slave clock signal 930 is received by frequency hopping module 920. Frequency hopping module 920 determines a pseudo-random hopping sequence of RF channels for RF communication module 914, in a synchronized fashion with frequency hopping module 812 of source device 800.

Data 704 is output by RF communication module 914, and is received by baseband processing module 916. DSP 918 is optionally present in baseband processing module 916. When present, DSP 918 may be used to process data 704. For example, DSP 918 may be used to convert a stream of data from one form to another form of data that is output to codec 904 in data signal 928. For example, data 704 may include MP3 audio data. DSP 918 may be used to convert the MP3 audio data to SBC data, which is output on data signal 928. Alternatively, DSP 918 is not present, and data 704 may be left unaltered when output on data signal 928.

Referring back to flowchart 600 of FIG. 6, in step 606, the data is decoded. For example, as shown in FIG. 9, codec 904 may perform decoding. In FIG. 9, codec 904 receives data signal 928, and generates an output signal 924. Codec 904 performs bit stream decoding of data on data signal 928 to generate output signal 924. Furthermore, depending on the implementation of output element 906, which receives output signal 924, codec 904 may perform a digital-to-analog conversion (e.g., may include a digital-to-analog converter (DAC)), to convert the decoded data to analog form. For example, in an embodiment, output element 906 is a speaker that receives output signal 924 as an analog audio signal. In another embodiment, output element 906 is a display device, such as a high-definition display device that receives output signal 924 as a digital data stream. For example, output element 906 may have a digital interface, such as an HDMI (high-definition multimedia interface) interface configured for digital audio/video data. Thus, in embodiments, output signal 924 may be a digital or analog signal, depending on the particular implementation of output element 906.

In step 608, at least one delay and the source clock timestamp are subtracted from a current value of the local clock signal to generate a local latency value. For example, as shown in FIG. 9, sink device 900 may include processing module 910, which may be configured to provide any type of processing for sink device 900. Processing module 910 may include hardware, software, firmware, or any combination thereof to perform its functions. For example, processing module 920 may include digital logic, a processor, a microcontroller, a DSP, and/or other processing elements. In FIG. 9, processing module 910 includes latency calculator 502. In an embodiment, latency calculator 502 is configured to perform step 608. As shown in FIG. 9, latency calculator 502 receives master piconet clock timestamp 706 and receives slave clock signal 930. Furthermore, latency calculator 502 may store and/or receive an indication of one or more delays for data passing through sink device 900 to output element 906. For example, latency calculator 502 may store or receive an indication of a delay of data received on data signal 928 passing through codec 904 (e.g., a FIFO delay). In another example, latency calculator 502 may store or receive an indication of a delay of data passing through baseband processing module 916 (e.g., a buffer delay, a delay of DSP 918, etc.).

Thus, in an embodiment, latency calculator 502 may perform the following equation to generate a local latency value, $\text{Latency}_{Local}$:

$$\text{Latency}_{Local} = LC - \left( \sum_{i=0}^{N} Delay(i) + SCTS \right)$$

where:
LC=slave clock signal 930;
Delay(i)=one or more (N) data delays in sink device 900; and
SCTS=master piconet clock timestamp 706.

Latency calculator 502 may include hardware, software, firmware, or any combination thereof to perform its functions. For example, the above equation may be implemented in latency calculator 502 in digital logic, in software or firmware that runs in a processor, or otherwise. Note that in alternative embodiments, a local latency for data passing through sink device 900 can be calculated in other ways, as would be known to persons skilled in the relevant art(s).

In step 610, a difference between a desired latency value and the local latency value is determined. For example, as shown in FIG. 9, storage 912 stores a desired latency value 926, which is received by latency calculator 502. Desired latency value 926 is a desired latency value (e.g., a time delay) for data output at output element 906. For example, desired latency value 926 may be a desired time period for output element 906 to receive output signal 924 after data 704 is received by sink device 900 (e.g., after being recovered by RF communication module 914 from communication signal 818). Thus, if the latency difference (determined in step 610) from the desired latency value 926 value is 50 μsec, it is desired that output signal 924 be received by output element 906 (e.g., to be played as audio, displayed as video, etc.) 50 μsec after the corresponding data is received at sink device 900. One or more sink devices in addition to sink device 900 may store the same value for desired latency value 926. Thus, the sink device(s) in addition to sink device 900 may also generate their respective output signals synchronized with sink device 900, keeping all of the respective audio, video, and/or other output signal types in sync. In this manner, coordinated sound, video images, and/or other output signals may be generated by a plurality of sink devices. Furthermore, the sink devices do not need to directly communicate with each other. In an embodiment, desired latency value 926 is pre-stored in sink device 900 (e.g., stored during manufacture/test of sink device 900). In another embodiment, desired latency value 926 is transmitted to sink device 900 from source device 800 (e.g., transmitted in a conventional or proprietary instruction/message) and stored in storage 912.

Thus, in an embodiment, latency calculator 502 may perform the following equation to determine the difference, $\text{Latency}_{Diff}$, between a desired latency value and the local latency value:

$$\text{Latency}_{Diff} = \text{Latency}_{Desired} - \text{Latency}_{Local}$$

where:
$\text{Latency}_{Desired}$=desired latency value 926.

For example, the above equation may be implemented in latency calculator 502 in a variety of ways, including in digital logic, in software or firmware that runs in a processor, or otherwise.

In an embodiment, step 608 may be repeated multiple times for additional communication packets to generate multiple local latency values, which may be averaged, and the average local latency value may be compared to the desired latency value in step 610. This averaging process may be repeated, such that a moving local latency value average is generated. Using average values for local latency to adjust the rate of codec clock signal 938 may compensate for system jitter, leading to greater stability in codec clock signal 938 and smoother output audio signals.

In step 612, a rate of a clock signal of the codec is adjusted according to the determined difference. For example, as shown in FIG. 9, codec clock generator 908 generates a codec clock signal 938 that is received by codec 904. Codec clock signal 938 is used as a clock for codec 904, to clock, and thereby control a rate of one or more processes performed by codec 904, such as decoding data and/or converting digital data to analog (when needed). Codec clock generator 908 receives a codec clock rate adjustment signal 940 from latency calculator 502. Codec clock rate adjustment signal 940 is configured to cause codec clock generator 908 to adjust a clock rate of codec clock signal 938 according to $\text{Latency}_{Diff}$. For example, in an embodiment, codec clock generator 908 may include a variable phase lock loop (PLL). Codec clock rate adjustment signal 940 may be received as an input reference signal by the variable PLL to speed up or slow down the oscillation rate of the PLL to vary the rate of codec clock signal 938. In other embodiments, codec clock rate adjustment signal 940 may cause codec clock generator 908 to vary a rate of codec clock signal 938 in alternative ways.

Codec clock rate adjustment signal 940 may be configured in a variety of ways. In one embodiment, codec clock rate adjustment signal 940 is a signal causing an adjustment in codec clock signal 938 proportional to the value of $\text{Latency}_{Diff}$. Alternatively, codec clock rate adjustment signal 940 provides one of a set of predetermined values that are selected based on the value of $\text{Latency}_{Diff}$. For example, the set may include three values that respectively cause a predetermined increase, a predetermined decrease, and no change in a rate of codec clock signal 938. For example, in an embodiment, codec clock rate adjustment signal 940 may have a zero value if no adjustment of codec clock signal 938 is needed. Furthermore, codec clock rate adjustment signal 940 may have a positive value if a rate of codec clock signal 938 is to be increased and may have a negative value if the rate of codec clock signal 938 is to be decreased. Alternatively, codec clock rate adjustment signal 940 may have a negative value if a rate of codec clock signal 938 is to be increased and may have a positive value if the rate of codec clock signal 938 is to be decreased. In further embodiments, codec clock rate adjustment signal 940 may have alternative values when no adjustment of codec clock signal 938 is needed, and to cause increases or decreases to a rate of codec clock signal 938.

In systems, any number of sink devices 900 may be used with source device 800 to output data in a parallel, synchronized fashion. By having a defined latency, synchronized outputs are created. Furthermore, synchronization can be obtained without direct communication between the sink devices. Still further, in BLUETOOTH embodiments, the existing piconet clocks of the master device and the slave (sink) device(s) can be used as the above described synchronized source and local clock signals, simplifying the overall system configuration.

A variety of types of source and sink devices may be configured to perform flowchart 600, and may include functionality similar to that shown in FIGS. 8 and 9. Several example types of source and sink devices are described below.

Figure 10:
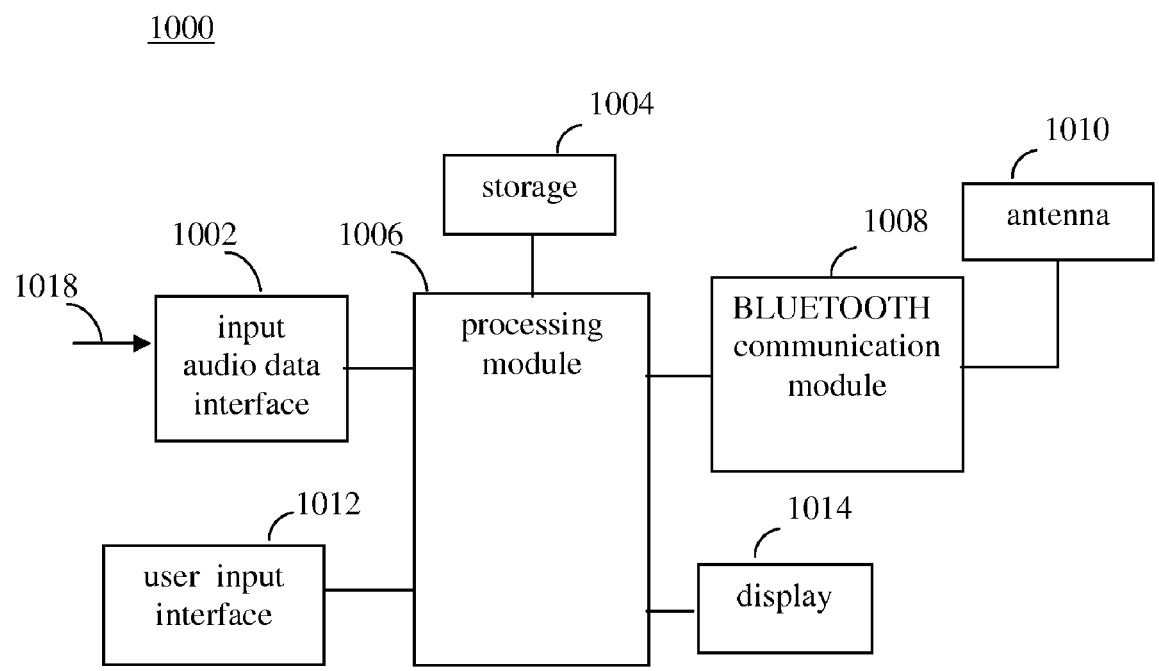
FIG. 10 shows a block diagram of an example music player, according to an embodiment of the present invention.
Figure 11:
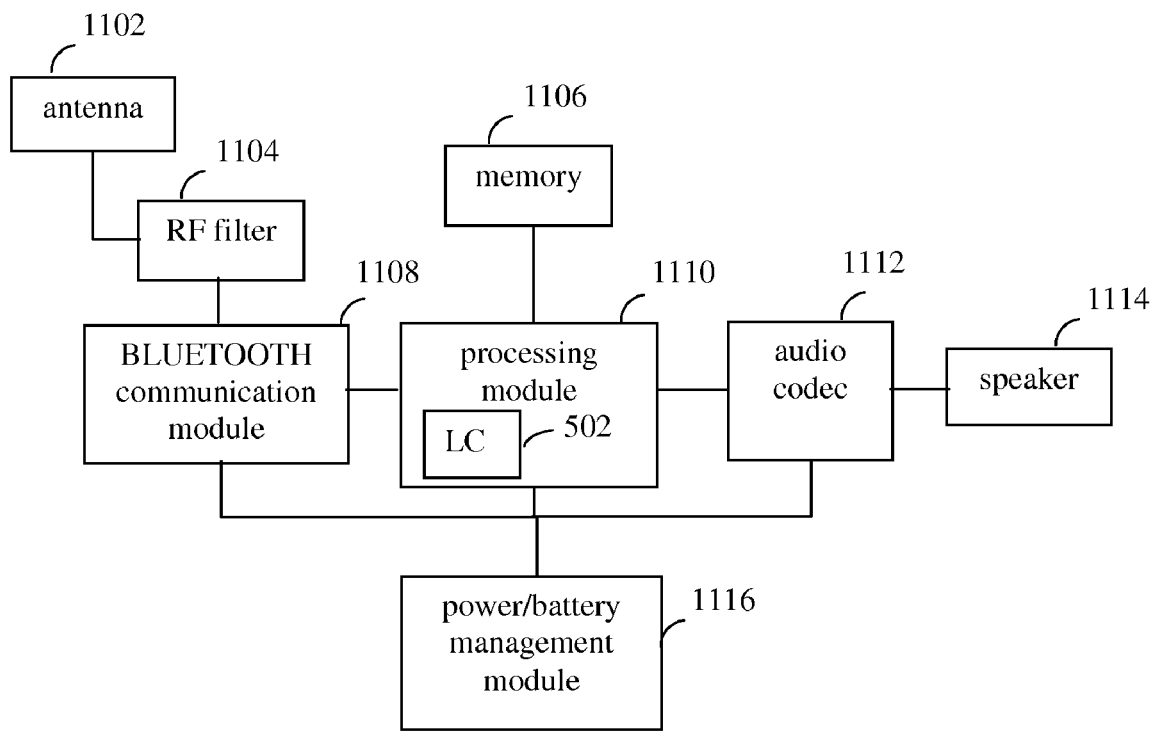
FIG. 11 shows a block diagram of an example earphone device, according to an embodiment of the present invention.

For example, FIG. 10 shows a block diagram of a music player 1000, which is an example of a source device, and FIG. 11 shows a block diagram of an earphone device 1100, which is an example of a sink device, according to example embodiments of the present invention. A pair of earphone devices 1100 may be used with music player 1000 in a music player system. For example, a first earphone device 1100 may receive right channel audio data from music player 1000 and a second earphone device 1100 may receive left channel audio data from music player 1000. Music player 1000 may be an immobile music player, such an AM and/or FM radio console, a satellite radio device, a tuner, or a receiver, or a mobile music player, such as an IPOD or MP3 music player. Earphone device 1100 is worn on the head of a user, adjacent or attached to the user's ear. Using a pair of earphone devices 1100 with a latency calculator embodiment enables synchronized, stereo audio, without wires and without audible distortion. The pair of earphone devices 1100 may be unconnected, or may be configured together in a headset.

As shown in FIG. 10, music player 1000 includes an input audio data interface 1002, storage 1004, a processing module 1006, a BLUETOOTH communication module 1008, an antenna 1010, a user input interface 1012, and a display 1014. These components may be contained in a housing, such as a stationary (e.g., shelf mounted) or a handheld housing. In an embodiment, components of music player 1000 may include the functionality/structure of similarly named components of source device 800 shown in FIG. 8. For example, BLUETOOTH communication module 1008 may include baseband processing module 802 and RF communication module 804 shown in FIG. 8.

Music player 1000 stores audio files, plays music, and enables a user to hear a song being played. Music files (e.g., MP3, AAC/M4A, Protected AAC, AIFF, WAV, Audible audiobook, APPLE Lossless audio file format, etc.) may be received on audio file input signal 1018 at input audio data interface 1002. Input audio data interface 1002 may include a conventional interface, such as USB (universal serial bus), FIREWIRE, Ethernet, parallel port, or other interface type for receiving audio file input signal 1018. The audio files are stored in storage 1004, which may be any suitable type of storage device, such as a memory (e.g., FLASH memory) or hard drive.

User input interface 1012 enables a user of music player 1000 to interact with music player 1000 to play audio files, manage storage of audio files, and to change volume, tone, treble, bass, etc. User input interface 1012 may include one or more buttons, a keyboard, a voice activated input system, a wheel such as a click wheel, etc. Display 1014 displays information regarding music player 1000, such as information regarding stored audio files, information regarding an audio file currently being played, etc. Display 1014 may include any type of display mechanism, including one or more LEDs (light emitting diodes), an LCD (liquid crystal display) panel, etc.

Processing module 1006 is coupled to each of input audio data interface 1002, storage 1004, BLUETOOTH communication module 1008, user input interface 1012, and display 1014. Processing module 1006 may be individually connected to these components, or one or more of these components may be connected to processing module 1006 in a common bus structure. Processing module 1006 monitors user input at user input interface 1012, reads audio files from storage 1004, causes corresponding display at 1014, and causes audio files to be supplied to BLUETOOTH communication module 1008 to be transmitted to a sink device via antenna 1010. BLUETOOTH communication module 1008 may stream the audio data to a sink device in a communication channel according to a BLUETOOTH Advanced Audio Distribution Profile (A2DP) format, in an embodiment.

In an embodiment, processing module 1006 includes a digital signal processor (DSP). When present, the DSP may apply special effects to an audio file (e.g., an equalization function), and streams the data to BLUETOOTH communication module 1008. The DSP may run a decompression algorithm that unencodes encoded audio files.

In an embodiment, music player 1000 is directly connected to an external AC or DC power source. Alternatively, music player 1000 is battery powered and may include a battery port.

As shown in FIG. 11, earphone device 1100 includes an antenna 1102, a RF filter 1104, a memory 1106, a BLUETOOTH communication module 1108, a processing module 1110, an audio codec 1112, a speaker 1114, and a power/battery management module 1116. These components may be contained in a housing, such as a headset, an earbud, a canalphone, etc. In an embodiment, components of earphone device 1100 may include the functionality/structure of similarly named components of sink device 900 shown in FIG. 9. For example, BLUETOOTH communication module 1108 may include baseband processing module 916 and RF communication module 914 shown in FIG. 9. Furthermore, processing module 1110 may include latency calculator 502. In the example of FIG. 11, output element 906 is speaker 1114. Components of earphone device 1100 may be interconnected as shown in FIG. 11, or in other ways, such as by a common bus structure. Earphone device 1100 receives audio data from a music player, such as music player 1000 shown in FIG. 10, converts the audio data to sound, broadcasting the resulting sound from speaker 1114.

Antenna 1102 receives a transmitted RF BLUETOOTH communication signal that includes audio data. RF filter 1104 is optionally present to filter the received RF BLUETOOTH communication signal. BLUETOOTH communication module 1108 recovers audio data from the RF signal, and outputs the audio data to processing module 1110. Processing module 1110 may buffer audio data in memory 1106. Memory 1106 may include any suitable type of storage, including a FLASH memory device. Latency calculator 502 of processing module 1110 compares present output latency against a desired output latency for earphone device 1100, and adjusts a rate of data output by audio codec 1112 accordingly. Audio codec 1112 performs bit stream decoding of the audio data (if needed) and converts the decoded data to an analog signal. In an embodiment, audio codec 1112 is included in an audio codec device. Speaker 1114 receives the analog signal, and outputs corresponding sound (e.g., music and/or voice). Power/battery management module 1116 converts input battery power to run various components of earphone device 1100.

Figure 12:
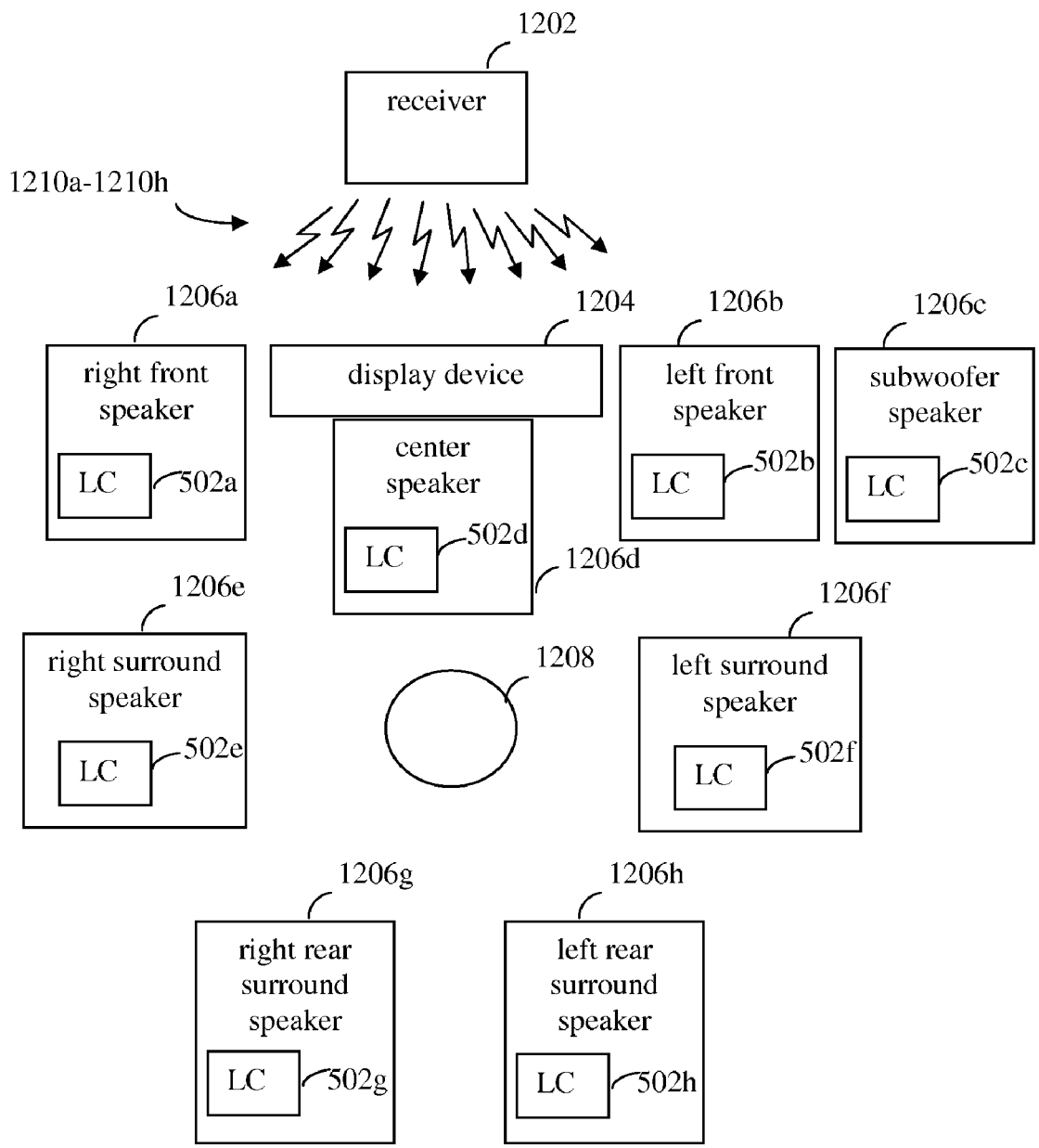
FIG. 12 shows an example audio/video system, according to an embodiment of the present invention.

Other types of audio systems other than a music player/earphone type system are applicable to embodiments of the present invention. For example, FIG. 12 shows an example audio/video system 1200, according to an embodiment of the present invention. System 1200 may be a home theater system, a commercial theater system, or other type of audio/video system. As shown in FIG. 12, audio/video system 1200 includes a receiver 1202, a display device 1204, a right front speaker 1206a, a left front speaker 1206b, a subwoofer speaker 1206c, a center speaker 1206d, a right surround speaker 1206e, a left surround speaker 1206f, a right rear surround speaker 1206g, and a left rear surround speaker 1206h. A user 1208 is positioned in front of display device 1204 and between speakers 1206a-1206h to receive output video and sound from system 1200. In the example of FIG. 12, system 1200 may be considered a 7.1 channel audio system, as left and right surround speakers 1206e and 1206f, as well as right and left rear surround speakers 1206g and 1206h are present. Alternatively, right and left rear surround speakers 1206g and 1206h may not be present to form a 5.1 channel audio system, or only a single rear surround speaker may be present to form a 6.1 channel audio system.

Receiver 1202 communicates with each of speakers 1206a-1206h with a respective communication signal 1210a-1210h to provide corresponding audio data. For example, communication signals 1210a-1210h may be BLUETOOTH communication signals, or communications signals according to another protocol. Receiver 1202 and speakers 1206a-1206h may each have a corresponding BLUETOOTH communication module. Furthermore, as shown in FIG. 12, each of speakers 1206a-1206h has a respective one of latency calculators 502a-502h. Each latency calculator 502a-502h compares a present output latency for a respective one of speakers 1206a-1206h against a desired output latency, and adjusts a rate of sound output accordingly, to synchronize audio of speakers 1206a-1206h.

Note that in an embodiment, display device 1204 may include a latency calculator to synchronize video output from display device 1204 with sound output by speakers 1206a-1206h.

Figure 13:
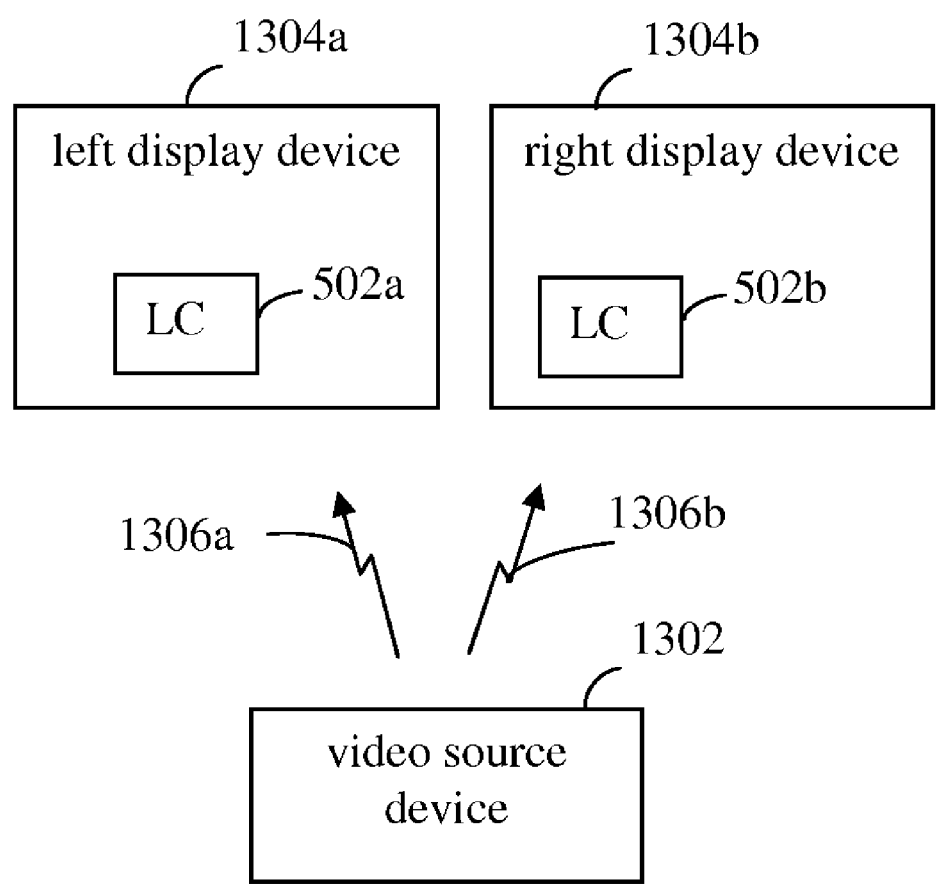
FIG. 13 shows an example multi-display video system, according to an embodiment of the present invention.

FIG. 13 shows an example multi-display video system 1300, according to an embodiment of the present invention. As shown in FIG. 13, system 1300 includes a video source device 1302, a left display device 1304a, and a right display device 1304b. Display devices 1304a and 1304b may display the same image or may display portions (e.g., each display half) of a single image. Display devices 1304a and 1304b may be any type of display devices, including flat screen televisions (e.g., plasma, LCD, or rear projection), projector televisions, CRT monitors, left and right displays in a head mounted display device, etc.

Video source device 1302 communicates with each of display devices 1304a and 1304b using a respective one of communication signals 1306a and 1306b to provide corresponding video data, such as MPEG formatted data. For example, communication signals 1306a and 1306b may be BLUETOOTH communication signals, or communications signals according to another protocol. Video source device 1302 and display devices 1304a and 1304b may each have a corresponding BLUETOOTH communication module. The BLUETOOTH communication module of video source device 1302 may stream the video data to right and left display devices 1304a and 1304b according to a BLUETOOTH Video Distribution Profile (VDP) format, in an embodiment.

Furthermore, as shown in FIG. 13, each of display devices 1304a and 1304b has a respective one of latency calculators 502a and 502b. Each latency calculator 502a and 502b compares present output latency for a respective one of display devices 1304a and 1304b against a desired output latency, and adjusts a rate of video output accordingly, to synchronize video streams of display devices 1304a and 1304b.

Further audio data and video data embodiments, and embodiments for other data types, are also intended to be within the scope and spirit of the present invention, as would be known to persons skilled in the relevant art(s).

Example Software Embodiments

In this document, the terms "computer program medium" and "computer usable medium" are used to generally refer to media such as a removable storage unit, a hard disk installed in hard disk drive, and signals (i.e., electronic, electromagnetic, optical, or other types of signals capable of being received by a communications interface). These computer program products are means for providing software to a computer system and to storing software in a computer system or other device. The invention, in an embodiment, is directed to such computer program products.

In an embodiment where aspects of the present invention are implemented using software/firmware, the software/firmware may be stored in a computer program product and loaded into a computer system or other device using a removable storage drive, hard drive, or communications interface. The computer system or other device may execute the software/firmware from a storage such as a hard drive or memory device (e.g., a ROM device such as an electrically erasable ROM, electrically programmable ROM, a RAM device such as a static RAM, dynamic RAM, etc.). This control logic software/firmware, when executed by a processor, causes the processor to perform the functions of the invention as described herein.

According to an example embodiment, a sink device may execute computer-readable instructions to calculate and adjust for latency as further described elsewhere herein, and as recited in the claims appended hereto.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. An output system, comprising:
a plurality of output devices that each pre-store a same desired latency value and each include
a radio frequency (RF) communication module configured to receive a communication packet from a source device, wherein the communication packet includes data and a source clock timestamp;
a local clock signal generator configured to generate a local clock signal synchronized with a source clock signal of the source device;
a codec configured to decode the data; and
a latency calculator configured to determine a difference between the desired latency value and a local latency value calculated for the output device based upon at least one delay internal to the output system and a difference between a timestamp in the communication packet and the local clock signal, wherein a rate of the codec is adjusted according to the determined difference;
whereby the plurality of output devices produce substantially synchronized output streams.

2. The output system of claim 1, wherein the codec is configured to decode the data and to convert the decoded data to an analog signal according to a codec clock signal;

wherein a rate of the codec clock signal is adjusted according to the determined difference to adjust the rate of the codec.

3. The output system of claim 2, wherein each output device of the plurality of output devices further includes:
an output element that receives the analog signal and generates an output signal.

4. The output system of claim 3, wherein the output element is a speaker, and wherein the output signal is an audio stream.

5. The output system of claim 1, wherein the latency calculator is configured to subtract at least one delay and the source clock timestamp from a current value of the local clock signal to generate the local latency value.

6. The output system of claim 5, wherein the at least one delay includes a current delay time for data to be processed by the codec.

7. The output system of claim 5, wherein the at least one delay includes a current delay time for data to be buffered.

8. The output system of claim 1, wherein a first output device is a first earphone and a second output device is a second earphone.

9. The output system of claim 8, wherein the source device, the first earphone, and the second earphone are configured to form a piconet having the source device as a master device, the first earphone as a first slave device, and the second earphone as a second slave device.

10. The output system of claim 1, wherein a first output device is a display device, and wherein the output signal is a video image stream.

11. The output system of claim 1, wherein the RF communication module is configured to receive communication signals configured according to a BLUETOOTH protocol, wherein the source clock signal is a master BLUETOOTH clock.

12. The output system of claim 1, wherein the local clock signal generator is configured to synchronize the local clock signal with the source clock signal upon receipt of a synchronization packet by the RF communication module from the source device.

13. The output system of claim 1, wherein each output device of the plurality of output devices further includes:
an output element that receives the decoded data and generates a digital output signal.

14. The output system of claim 13, wherein a first output device is a first video display and a second output device is a second video display.

15. The output system of claim 14, wherein the source device, the first video display, and the second video display are configured to form a piconet having the source device as a master device, the first video display as a first slave device, and a the second video display as a second slave device.

16. The output system of claim 13, wherein the output device is a display device, and wherein the output signal is a digital video image stream.

17. A method for synchronizing data output by a plurality of output devices, comprising:
performing steps (a)-(f) in each output device of the plurality of output devices to produce substantially synchronized output streams,
(a) receiving a communication packet from a source device, wherein the communication packet includes data and a source clock timestamp;
(b) generating a local clock signal synchronized with a source clock signal of the source device;
(c) decoding the data using a codec;
(d) subtracting at least one delay internal to the output device and the source clock timestamp from a current value of the local clock signal to generate a local latency value;
(e) determining a difference between a desired latency value and the local latency value, a same desired latency value being pre-stored in each output device of the plurality of output devices; and
(f) adjusting a rate of a clock signal of the codec according to the determined difference.

18. The method of claim 17, further comprising performing steps (g) and (h) in each output device:
(g) converting the decoded data to an analog signal according to a codec clock signal; and
(h) generating an output signal from the analog signal.

19. The method of claim 18, wherein each output device includes a speaker, wherein step (h) comprises:
generating an audio stream from the speaker.

20. The method of claim 17, wherein a first output device is a first earphone and a second output device is a second earphone, the method further comprising:
(g) forming a piconet having the source device as a master device, the first earphone as a first slave device, and the second earphone as a second slave device.

21. The method of claim 17, wherein a first output device is a first display device and a second output device is a second display device, the method further comprising:
(g) forming a piconet having the source device as a master device, the first display device as a first slave device, and the second display device as a second slave device.

22. The method of claim 17, wherein a first output device is a display device, wherein said generating an output signal comprises:
generating a video image stream by the display device.

23. The method of claim 17, wherein said receiving comprises:
receiving the communication packet according to a BLUETOOTH protocol.

24. The method of claim 17, further comprising performing steps (g) and (h) in each output device:
(g) receiving a synchronization packet from the source device that provides information regarding the source clock signal; and
(h) synchronizing the local clock signal with the source clock signal according to the provided information.

* * * * *

UNITED STATES PATENT AND TRADEMARK OFFICE
CERTIFICATE OF CORRECTION

PATENT NO.      : 8,102,836 B2                                    Page 1 of 1
APPLICATION NO. : 11/752880
DATED           : January 24, 2012
INVENTOR(S)     : Sven Jerlhagen et al.

It is certified that error appears in the above-identified patent and that said Letters Patent is hereby corrected as shown below:

In column 15, line 26, in claim 9, delete "a the" and insert -- the --, therefor.

In column 15, line 52, in claim 15, delete "a the" and insert -- the --, therefor.

Signed and Sealed this
Eighteenth Day of September, 2012

David J. Kappos
*Director of the United States Patent and Trademark Office*